United States Patent
Hong et al.

(10) Patent No.: US 9,543,884 B2
(45) Date of Patent: Jan. 10, 2017

(54) MOTOR CONTROL DEVICE OF AIR CONDITIONER USING DISTRIBUTED POWER SUPPLY

(75) Inventors: Young Ho Hong, Changwon-si (KR); Ho Yong Jang, Changwon-si (KR); Yoo Sool Yoon, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 930 days.

(21) Appl. No.: 13/377,095

(22) PCT Filed: Jun. 10, 2009

(86) PCT No.: PCT/KR2009/003104
§ 371 (c)(1),
(2), (4) Date: Mar. 19, 2012

(87) PCT Pub. No.: WO2010/143758
PCT Pub. Date: Dec. 16, 2010

(65) Prior Publication Data
US 2012/0161525 A1    Jun. 28, 2012

(51) Int. Cl.
*H02J 3/34* (2006.01)
*H02P 27/08* (2006.01)
*H02J 3/38* (2006.01)

(52) U.S. Cl.
CPC ............. *H02P 27/08* (2013.01); *H02J 3/382* (2013.01); *H02J 3/383* (2013.01); *H02J 3/386* (2013.01); *Y02E 10/563* (2013.01); *Y02E 10/763* (2013.01); *Y10T 307/664* (2015.04)

(58) Field of Classification Search
CPC ..................... H02P 27/06; H02P 27/08–27/14
USPC .................................. 62/236, 235.1; 307/82
See application file for complete search history.

(56) References Cited

U.S. PATENT DOCUMENTS

| | | | | |
|---|---|---|---|---|
| 3,538,405 A | * | 11/1970 | Borden | H02M 3/00 307/82 |
| 4,736,595 A | * | 4/1988 | Kato | 62/160 |
| 6,508,072 B1 | | 1/2003 | Kanazawa et al. | 62/228.4 |
| 6,646,407 B2 | * | 11/2003 | Rahman et al. | 318/701 |
| 6,822,417 B2 | * | 11/2004 | Kawaji et al. | 318/701 |

(Continued)

FOREIGN PATENT DOCUMENTS

| JP | 05-199798 A | 8/1993 |
|---|---|---|
| KR | 10-2003-0012576 A | 2/2003 |
| KR | 10-2009-0052167 A | 5/2009 |

OTHER PUBLICATIONS

International Search Report dated Mar. 11, 2010 issued in Application No. PCT/KR2009/003104.

Primary Examiner — Jared Fureman
Assistant Examiner — Joel Barnett
(74) Attorney, Agent, or Firm — KED & Associates, LLP

(57) ABSTRACT

A motor control device of an air conditioner may include: a DC/DC converter that level-changes a DC power supply supplied from the outside to output the level-charged DC power supply to a DC bus terminal; a bidirectional DC/AC converter that converts the DC power supply of the DC bus terminal into an AC power supply to transfer the converted AC power supply to a system, or that converts the AC power supply from the system into the DC/power supply to supply the converted DC power supply to the DC bus terminal; and an inverter that converts the DC power supply of the DC bus terminal into the AC power supply by a switching operation, and drives a compression motor by the converted AC power supply.

7 Claims, 12 Drawing Sheets

(56) References Cited

U.S. PATENT DOCUMENTS

| | | | | |
|---|---|---|---|---|
| 7,614,245 | B2* | 11/2009 | Matsui et al. | 62/230 |
| 8,018,748 | B2* | 9/2011 | Leonard | 363/95 |
| 2005/0105224 | A1* | 5/2005 | Nishi | 361/18 |
| 2008/0129120 | A1* | 6/2008 | Su | H02J 9/062 307/80 |
| 2010/0073969 | A1* | 3/2010 | Rajagopalan et al. | 363/37 |

* cited by examiner

MOTOR CONTROL DEVICE OF AIR CONDITIONER USING DISTRIBUTED POWER SUPPLY

CROSS-REFERENCE TO RELATED PATENT APPLICATIONS

This application is a U.S. National Stage Application under 35 U.S.C. §371 of PCT Application No. PCT/KR09/003104, filed Jun. 10, 2009.

TECHNICAL FIELD

The present invention relates to a motor control device of an air conditioner using a distributed power supply and more specifically to a motor control device of an air conditioner using a distributed power supply that may convert DC power from an outside to AC power and supply the AC power to a system or drive a motor for a compressor.

BACKGROUND ART

Air conditioners are devices that are arranged in bed rooms, living rooms, or business shops and adjust temperature, moisture, cleanness and air flow to maintain pleasant indoor environments.

Such air conditioners are generally classified into an integrated type or a separate type. In terms of functions, the integrated and separate types are the same. However, the integrated type air conditioner has cooling and heat radiating functions integrated and is installed on a wall or window in a house, and the separate type air conditioner has an indoor unit installed in a room to perform room cooling and heating and an outdoor unit installed outside the room to perform heat radiating and compressing functions, wherein the indoor and outdoor units separated from each other are connected to each other through a coolant pipe.

Meanwhile, an air conditioner uses a motor for a compressor and a motor control device for controlling the motor.

FIG. 1 is a circuit diagram illustrating a conventional motor control device of an air conditioner.

Referring to FIG. 1, the conventional motor control device of an air conditioner converts commercial AC power into DC power through a converter and converts the DC power into AC power of a predetermined frequency through an inverter to drive a motor in an air conditioner. The converter is controlled by a converter control unit and the inverter is controlled by an inverter control unit.

The converter is subjected to power factor correction and DC voltage boosting by a switching operation. However, since switching elements in the converter 110 perform high-speed switching, harmonic current occurs that flows into a system connected to a commercial AC power supply to influence other devices connected to the system. For preventing this, a separate EMI noise filter is sometimes provided at an input terminal connected to the commercial AC power supply.

Every country has its own procedure to regulate such harmonic current. In particular, the EU (European Union) specifies regulations on harmonic current of less than 16 A in EN 61000-3-2 and regulations on harmonic current of 16 A or more in 61000-3-12.

DISCLOSURE

Technical Problem

An object of the present invention is to provide a motor control device of an air conditioner that converts DC power from an outside into AC power and supplies the AC power to a system or drives a motor for a compressor thereby removing harmonic current.

Technical Solution

To solve the above and other problems, a motor control device of an air conditioner using a distributed power supply according to an embodiment of the present invention includes a dc/dc converter to convert a level of DC power supplied from an outside and to output the level changed power to a DC terminal bus, a bidirectional dc/ac converter to convert the DC terminal bus DC power into AC power and to transfer the AC power to a system, or to convert the AC power from the system into DC power and to supply the DC power to the DC terminal bus, and an inverter to convert the DC terminal bus DC power into AC power by a switching operation and to drive a motor for a compressor using the converted AC power.

A motor control device of an air conditioner according to another embodiment of the present invention includes a dc/dc converter to convert a level of DC power supplied from an outside and to output the level changed power to a DC terminal bus, a bidirectional dc/ac converter to convert the DC terminal bus DC power into AC power and to transfer the AC power to a system, or to convert the AC power from the system into DC power and to supply the DC power to the DC terminal bus, and a plurality of inverters to respectively convert the DC terminal bus DC power into AC power by a switching operation and to drive a plurality of motors for a compressor using the converted AC power.

A motor control device of an air conditioner according to still another embodiment of the present invention includes a plurality of dc/dc converters to convert levels of DC power supplied from a plurality of power supplying sources and to output the level changed power to a DC terminal bus, a bidirectional dc/ac converter to convert the DC terminal bus DC power into AC power and to transfer the AC power to a system, or to convert the AC power from the system into DC power and to supply the DC power to the DC terminal bus, and an inverter to convert the DC terminal bus DC power into AC power by a switching operation and to drive a motor for a compressor using the converted AC power.

Advantageous Effects

As described above, the motor control device of an air conditioner using a distributed power supply according to the embodiments of the present invention converts DC power from an outside into AC power using a dc/dc converter and supplies the AC power to a system or drives a motor for a compressor, thereby preventing problems with the harmonic current.

Further, there is no need for a separate EMI noise filter thus saving manufacturing costs.

Still further, it may be possible to supply power to the system using a bidirectional dc/ac converter or to drive the motor for a compressor using power from the system.

Still further, DC power generated from various energy supplying sources is used to drive the air conditioner so that energy may be efficiently used.

BEST MODE

Hereinafter, embodiments of the present invention will be described in detail with reference to the accompanying drawings.

Figure 1:
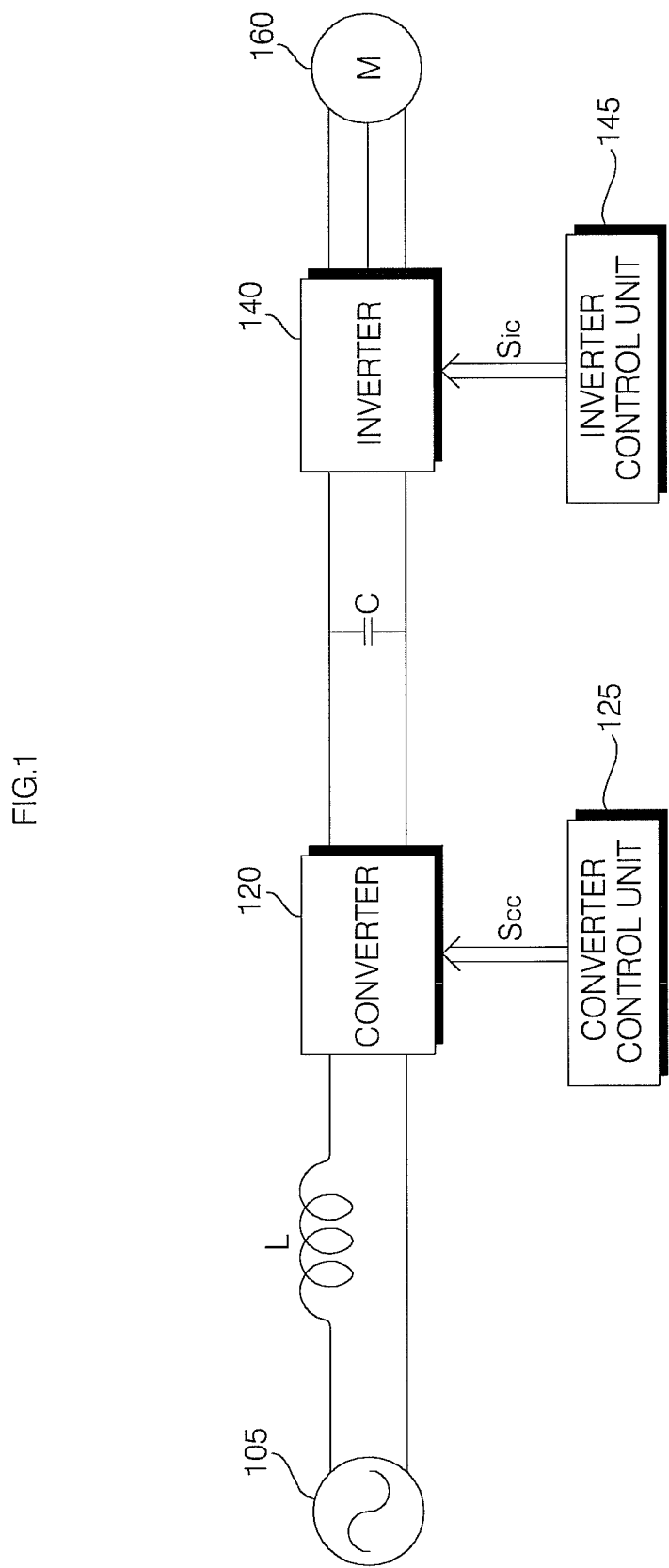
FIG. 1 is a circuit diagram illustrating a conventional motor control device of an air conditioner.
Figure 2:
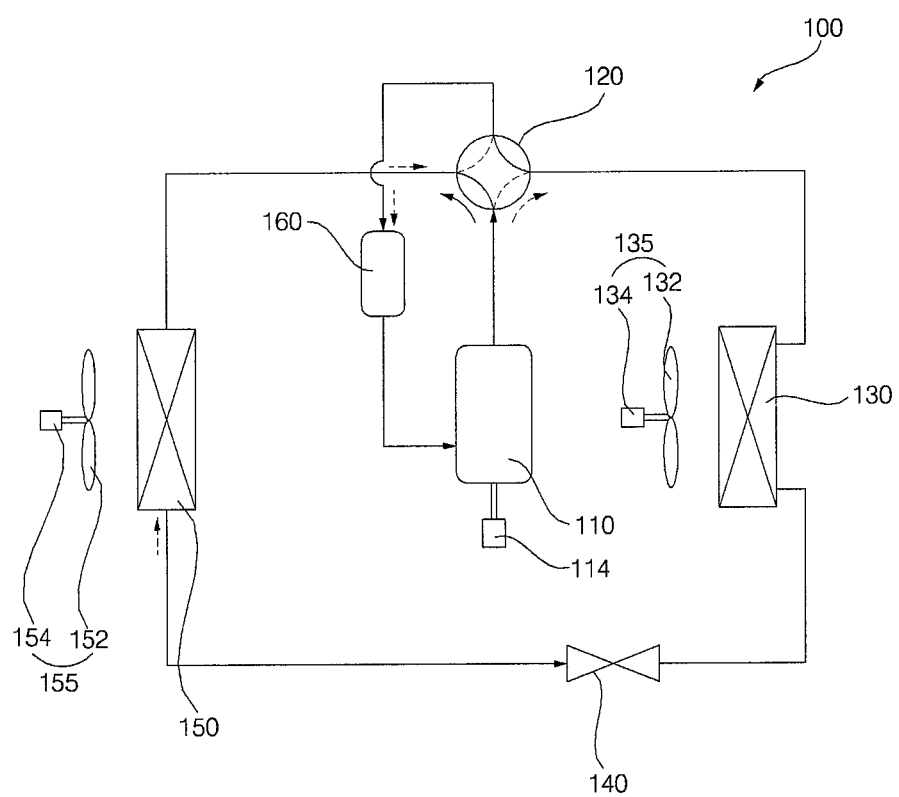
FIG. 2 is a view illustrating a configuration of an air conditioner according to the present invention.

FIG. 2 is a view illustrating a configuration of an air conditioner according to the present invention.

Referring to FIG. 2, the air conditioner 100 includes a compressor 110, an outdoor heat exchanger 130, a four-way valve 120, an accumulator 160, an expansion valve 140, and an indoor heat exchanger 150.

The air conditioner 100 may be configured as a room cooler for cooling a room or as a heat pump for cooling or heating a room.

In the case that the air conditioner 100 is configured as a heat pump, the outdoor heat exchanger 130 operates as a condenser during a room cooling operation and as an evaporator during a room heating operation. The indoor heat exchanger 150 operates as an evaporator during the room cooling operation and as a condenser during the room heating operation.

The compressor 110 compresses a low temperature, low pressure gaseous coolant, as introduced, into a high temperature, high pressure gaseous coolant. As the compressor 110, a variable displacement compressor or a fixed displacement compressor may be used. Although having various structures, the variable displacement compressor may be a compressor having an inverter structure for ease of control.

The compressor 110 is operated by a motor control device 114 of the air conditioner. The motor control device 114 of the air conditioner according to the present invention will be described below with reference to FIG. 3.

The four-way valve 120 is a flow path switching valve that is connected to the compressor 110 and switches the flow of a coolant during room cooling or heating. The four-way valve 120 guides a coolant compressed in the compressor 110 to the outdoor heat exchanger 130 during room cooling and to the indoor heat exchanger 150 during room heating.

The outdoor heat exchanger 130 operates as a condenser during a room cooling operation and as an evaporator during a room heating operation. By operation of an outdoor blower 135 having an outdoor fan 132 and an outdoor motor 134 rotating the outdoor fan 132, the outdoor heat exchanger 130 performs heat exchange.

The expansion valve 140 is arranged between the indoor heat exchanger 150 and the outdoor heat exchanger 130 and throttles a condensed coolant. The expansion valve 140 throttles a liquid coolant introduced from the outdoor heat exchanger 130 and supplies the throttled coolant to the indoor heat exchanger 150 during a room cooling operation and throttles the liquid coolant introduced from the indoor heat exchanger 150 and supplies the throttled coolant to the outdoor heat exchanger 130 during a room heating operation.

The indoor heat exchanger 150 operates as an evaporator during a room cooling operation and as a condenser during a room heating operation. By an indoor blower 155 having an indoor fan 152 and an indoor fan motor 154 rotating the indoor fan 152, the indoor heat exchanger 150 performs heat exchange.

The accumulator 160 is arranged between an inlet of the compressor 110 and the four-way valve 120 and temporarily stores a gasified coolant to remove unwanted materials and moisture, then supplies a coolant with a constant pressure to the compressor 110. During a room cooling operation, the accumulator 160 removes unwanted materials and moisture from the gasified coolant introduced via the indoor heat exchanger 150 into the four-way valve 120 and supplies the coolant to the compressor 110, and during a room heating operation, removes unwanted materials and moisture from the gasified coolant introduced via the outdoor heat exchanger 130 into the four-way valve 120 and supplies the coolant to the compressor 110.

Although not shown in the figures, a phase separator may be further provided at the side of the indoor heat exchanger 150. Accordingly, a second expansion valve may be further provided that throttles a coolant that has passed through the phase separator.

The components 110, 120, 130, 140, 150, and 160 are connected to each other through pipes.

Although not shown in the figures, a discharge pressure detector for detecting a discharge pressure of a coolant discharged from the compressor 110 and a discharge temperature detector for detecting a discharge temperature of the coolant discharged from the compressor 110 may be further provided in the compressor 110. Further, an indoor temperature detector for detecting a temperature of a surrounding of the indoor heat exchanger 150 or an outdoor temperature detector for detecting a temperature of a surrounding of the outdoor heat exchanger 130 may be provided.

Figure 3:
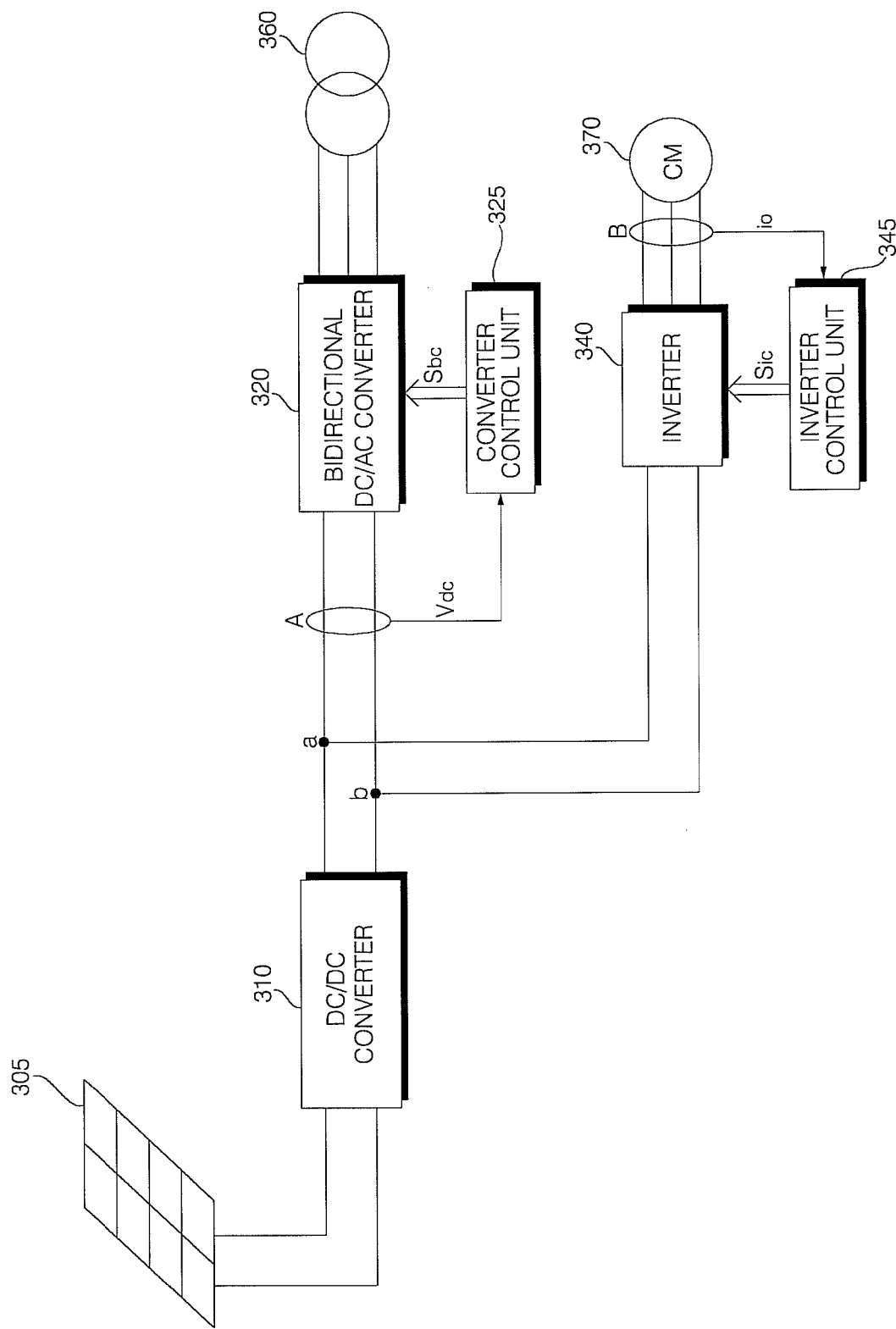
FIG. 3 is a circuit diagram illustrating a motor control device of an air conditioner using a distributed power supply according to an embodiment of the present invention.

FIG. 3 is a circuit diagram illustrating a motor control device of an air conditioner using a distributed power supply according to an embodiment of the present invention.

Referring to FIG. 3, the motor control device of an air conditioner includes a dc/dc converter 310, a bidirectional dc/ac converter 320, and an inverter 340. The motor control device of an air conditioner as shown in FIG. 3 may further include a converter control unit 325, an inverter control unit 345, a power detecting unit A, and an output current detecting unit B.

A system as shown in FIG. 3, in which input power is split and supplied to an outside 305 and a system 360 is called a "distributed power system." According to the present invention, the motor 370 for an air conditioner is controlled using such distributed power.

First, the dc/dc converter 310 changes the level of direct current (DC) power supplied from an outside and outputs the level changed DC power to a bus at a DC terminal. The DC power supplied from the outside may be DC power generated using at least one of solar power, wind power, tidal power, and geothermal power. Hereinafter, an example is described where solar power is converted into the DC power. Although a solar cell 305 is exemplified in the figure to convert solar power into electrical power, the present invention is not limited thereto.

The dc/dc converter 310 changes the level of the DC power inputted and outputs the level changed DC power to a bus at the DC terminal. As the dc/dc converter 310, either a step-up type for raising the level or a step-down type for lowering the level may be used. For this purpose, the dc/dc converter 310 may include a switching element (not shown) and a transformer (not shown). Although not shown in the figures, control power may be supplied from the dc/dc converter 310 for operating the converter control unit 325 and the inverter control unit 345. That is, the dc/dc converter 310 may output various levels of DC power.

Hereinafter, the DC terminal bus is represented as being between a and b terminals that are output terminals of the dc/dc converter 310, and DC power at the DC terminal bus is represented as "Vdc."

The bidirectional dc/ac converter 320 converts the DC power Vdc at the DC terminal bus into AC power and transfers the AC power to the system 360 or converts AC power from the system 360 into DC power and supplies the DC power to the DC terminal bus (a-b terminals). Here, the system 360 may be a three-phase AC power supply as shown but not limited thereto, and may be a single phase AC power supply.

The bidirectional dc/ac converter 320 includes a plurality of switching elements (not shown), and according to a switching operation based on a bidirectional converter control signal Sbc from the converter control unit 325, transfers power to the system 360 or to the DC terminal bus (a-b terminals).

The converter control unit 325 controls the bidirectional dc/ac converter 320. For example, when the DC terminal DC power Vdc detected from the power detecting unit A is not less than a predetermined value, the converter control unit 325 controls the bidirectional dc/ac converter 320 to convert the DC terminal bus DC power Vdc into AC power and transfer the AC power to the system 360, and when the DC terminal bus DC power (Vdc) is less than the predetermined value, the converter control unit 325 controls the bidirectional dc/ac converter 320 to convert AC power from the system 360 into DC power and transfer the DC power to the DC terminal bus (a-b terminals).

Although not shown in the figures, the converter control unit 325 may also control the dc/dc converter 310. For example, the converter control unit 325 may adjust the amount of level change of the dc/dc converter 310 using DC terminal DC power Vdc detected from the power detecting unit A. For this purpose, the converter control unit 325 outputs a converter control signal (not shown) to control on/off timing of a switching element in the dc/dc converter 310.

The power detecting unit A detects DC power (Vdc) at the DC terminal bus. For power detection, a resistor may be used. The detected DC terminal bus DC power Vdc is input to the converter control unit 325.

Although not shown in the figures, a capacitor for storing the DC terminal bus DC power Vdc may be provided at the DC terminal bus (a-b terminals). Due to the capacitor (not shown), the DC terminal bus DC power Vdc is stored in the capacitor and is thus stably supplied to the bidirectional dc/ac converter 320.

The inverter 340 includes a plurality of switching elements for an inverter (not shown) and converts the DC terminal bus DC power Vdc into three-phase AC power with a predetermined frequency and outputs the AC power according to an on/off operation of the switching elements. Specifically, an upper arm switching element and a lower arm switching element connected in series with the upper arm switching element make a pair, and total three pairs of upper and lower arm switching elements are connected in parallel to each other. A diode is connected reversely in parallel with each switching element. When a switching control signal Sic from the inverter control unit 345 is input to a gate terminal of each switching element, the switching element performs a switching operation. Accordingly, three-phase AC power having a predetermined frequency is output.

The three-phase AC power output from the inverter 340 is applied to each phase of a motor 370 for a compressor which is a three-phase motor. The motor 370 for a compressor includes a stator and a rotor. When AC power for each phase with a predetermined frequency is applied to a coil of the stator for each phase, the rotor rotates. The motor 370 for a compressor includes a BLDC motor, a synRM motor, and other various types of motors.

The inverter control unit 345 controls a switching operation of a switching element in the inverter 340. For this purpose, the inverter control unit 345 outputs an inverter switching control signal Sic to the inverter 340. The inverter switching control signal Sic, which is a switching control signal for PWM, is generated based on a detected output current io and output to the inverter 340.

For this purpose, the inverter control unit 345 may include an estimating unit (not shown) that estimates a speed of the rotor of the motor 370 based on the detected output current io, a current command generating unit (not shown) that generates a current command value based on the estimated speed and a speed command value, a voltage command generating unit (not shown) that generates a voltage command value based on the current command value and the detected output current io, and a switching control signal output unit (not shown) that outputs a switching control signal based on a voltage command value. The inverter switching control signal Sic is applied to a gate terminal of the inverter switching element to control on/off of the inverter switching element.

The output current detecting unit B detects an output current io flowing through the motor 370. The output current detecting unit B may be located between the inverter 340 and the motor 370, and may use a current sensor, a CT (current transformer), and a shunt resistor for current detection. The output current detecting unit B may be a shunt resistor having ends which are respectively connected to three lower arm switching elements of the inverter 340. The detected output current io is input to the inverter control unit 345 for generating the switching control signal Sic.

As described above, there does not occur a problem with a harmonic current by converting DC power from an outside into AC power using the dc/dc converter and supplying the converted AC power to the system or driving the motor for a compressor. Further, there is no need for a separate noise filter thus saving manufacturing costs. Further, a reactor for power factor correction is unnecessary. Further, it may be possible to supply power to a system using a bidirectional dc/ac converter or to drive a motor for a compressor using power from the system.

Figure 4:
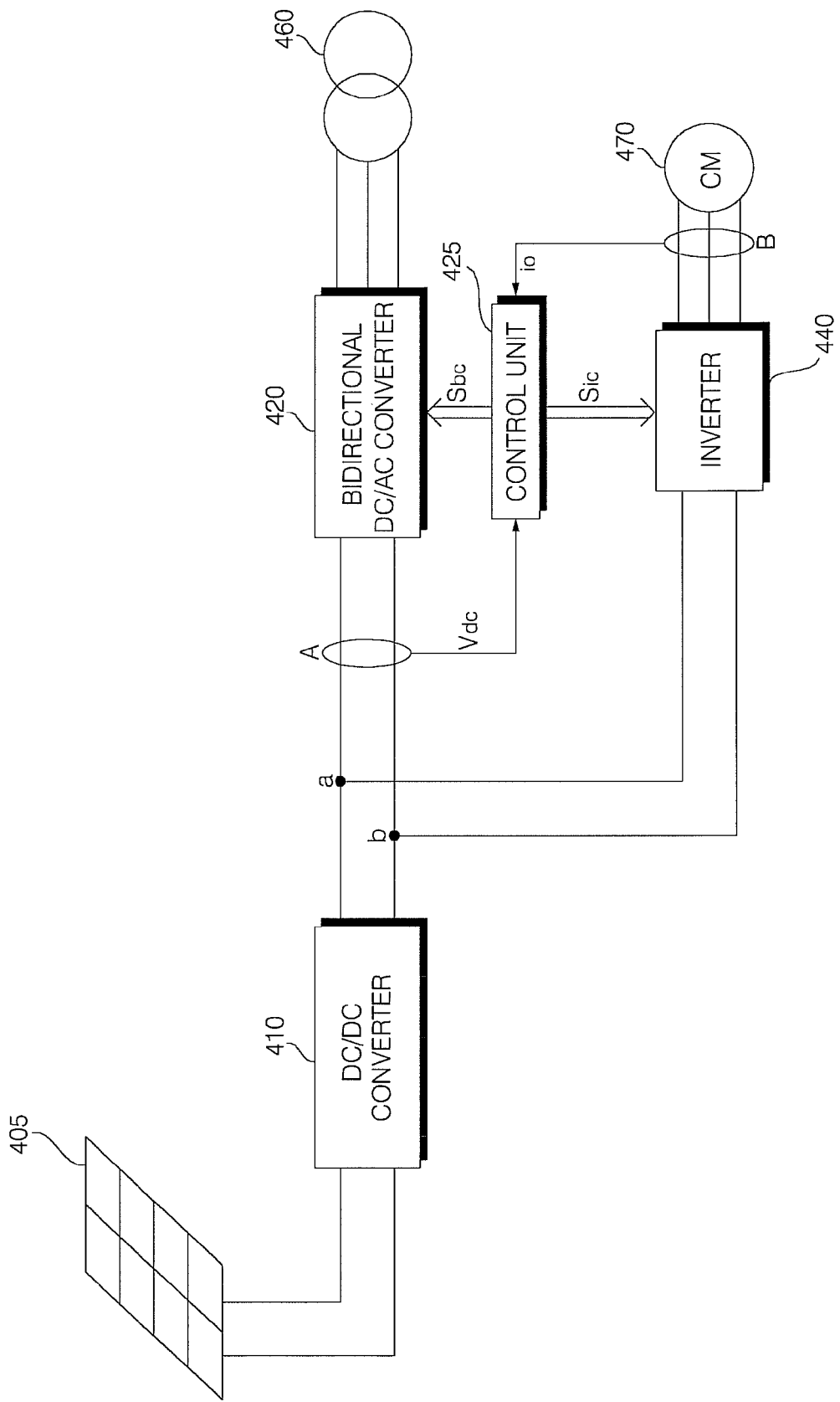
FIG. 4 is a circuit diagram illustrating a motor control device of an air conditioner using a distributed power supply according to an embodiment of the present invention.

FIG. 4 is a circuit diagram illustrating a motor control device of an air conditioner using a distributed power supply according to an embodiment of the present invention.

Referring to FIG. 4, the motor control device of an air conditioner using a distributed power supply is substantially similar to the motor control device of an air conditioner using a distributed power supply as shown in FIG. 3 except that the converter control unit 325 and the inverter control unit 345 shown in FIG. 3 are implemented as a single control unit 425. That is, the dc/dc converter 410, the bidirectional dc/ac converter 420, the inverter 440, the power detecting unit A, and the output current detecting unit B as shown in FIG. 4 are the same as those described in connection with FIG. 3.

The control unit 425 controls both the bidirectional dc/ac converter 420 and the inverter 440. The control unit 425 receives DC terminal bus DC power Vdc from the power detecting unit A for control of the bidirectional dc/ac converter 420 and outputs a bidirectional converter control signal Sbc, and for control of the inverter 440, receives an output current io from the output current detecting unit B and outputs an inverter switching control signal Sic.

Although not shown in the figures, the control unit 425 may also control the dc/dc converter 410. For example, the control unit 425 may adjust the amount of level change of the dc/dc converter 410 using the DC terminal bus DC power Vdc detected from the power detecting unit A.

Compared to FIG. 3, manufacturing costs may be saved by reducing the number of components in the control unit by integrating the control unit 425.

Figure 5:
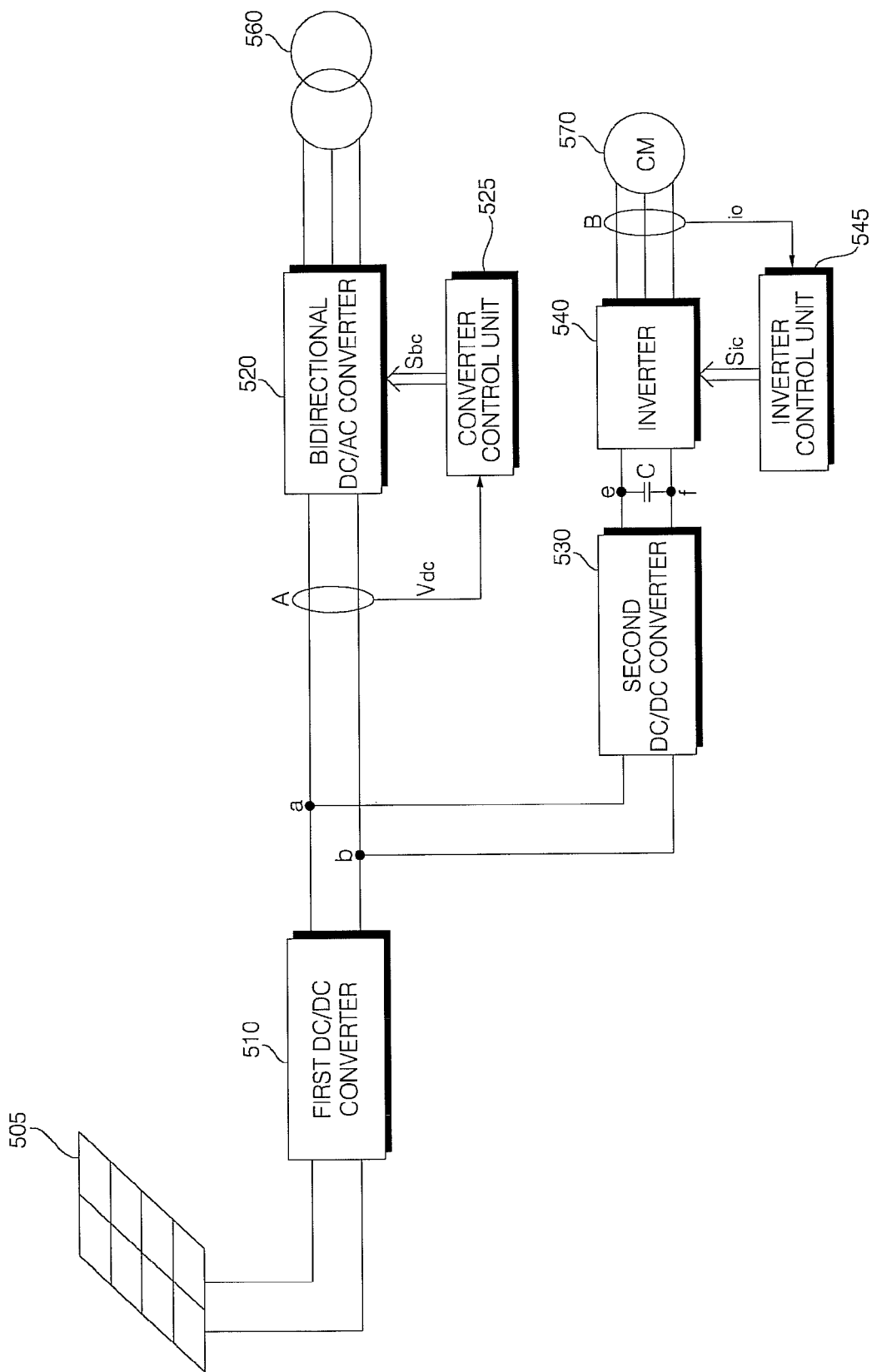
FIG. 5 is a circuit diagram illustrating a motor control device of an air conditioner using a distributed power supply according to an embodiment of the present invention.

FIG. 5 is a circuit diagram illustrating a motor control device of an air conditioner using a distributed power supply according to an embodiment of the present invention.

Referring to FIG. 5, the motor control device of an air conditioner using a distributed power supply as shown in FIG. 5 is substantially similar to the motor control device of an air conditioner using a distributed power supply as shown in FIG. 3 except that a second dc/dc converter 530 is further provided between the DC terminal bus (a-b terminals) and the inverter 540. Accordingly, the dc/dc converter 510, the bidirectional dc/ac converter 520, the converter control unit 525, the inverter 540, the inverter control unit 545, the power detecting unit A, and the output current detecting unit B are the same as those described in connection with FIG. 3.

The second dc/dc converter 530 changes a level of the DC terminal bus DC power Vdc and outputs the level changed power to the inverter 540. In the case that the level of the DC terminal bus DC power Vdc DC converted through the bidirectional dc/ac converter 520 or level changed through the dc/dc converter 510 may not be used, as is, in the inverter 540, the level is raised or lowered by the second dc/dc converter 530 thus enhancing converting capability of the inverter 540. That is, this may be used when DC power supplied from an outside 505 or AC power supplied from a system is unstable.

Further, control power for operating the converter control unit 525 and the inverter control unit 545 may be supplied from the second dc/dc converter 530. That is, the second dc/dc converter 530 may output various levels of DC power.

On the other hand, although not shown in the figures, the converter control unit 525 may control operation of the second dc/dc converter 530. For this purpose, the converter control unit 525 may receive the detected DC terminal bus DC power Vdc and output a second converter control signal (not shown) to the second dc/dc converter 530 so that the second dc/dc converter 530 converts DC power to have a predetermined level and outputs the predetermined level of power.

On the other hand, a smoothing capacitor C is positioned between the second dc/dc converter 530 and the inverter—that is, between terminals e and f—to smooth and store DC power converted through the second dc/dc converter 530. Accordingly, the stored DC power may be stably supplied to the inverter 540.

Figure 6:
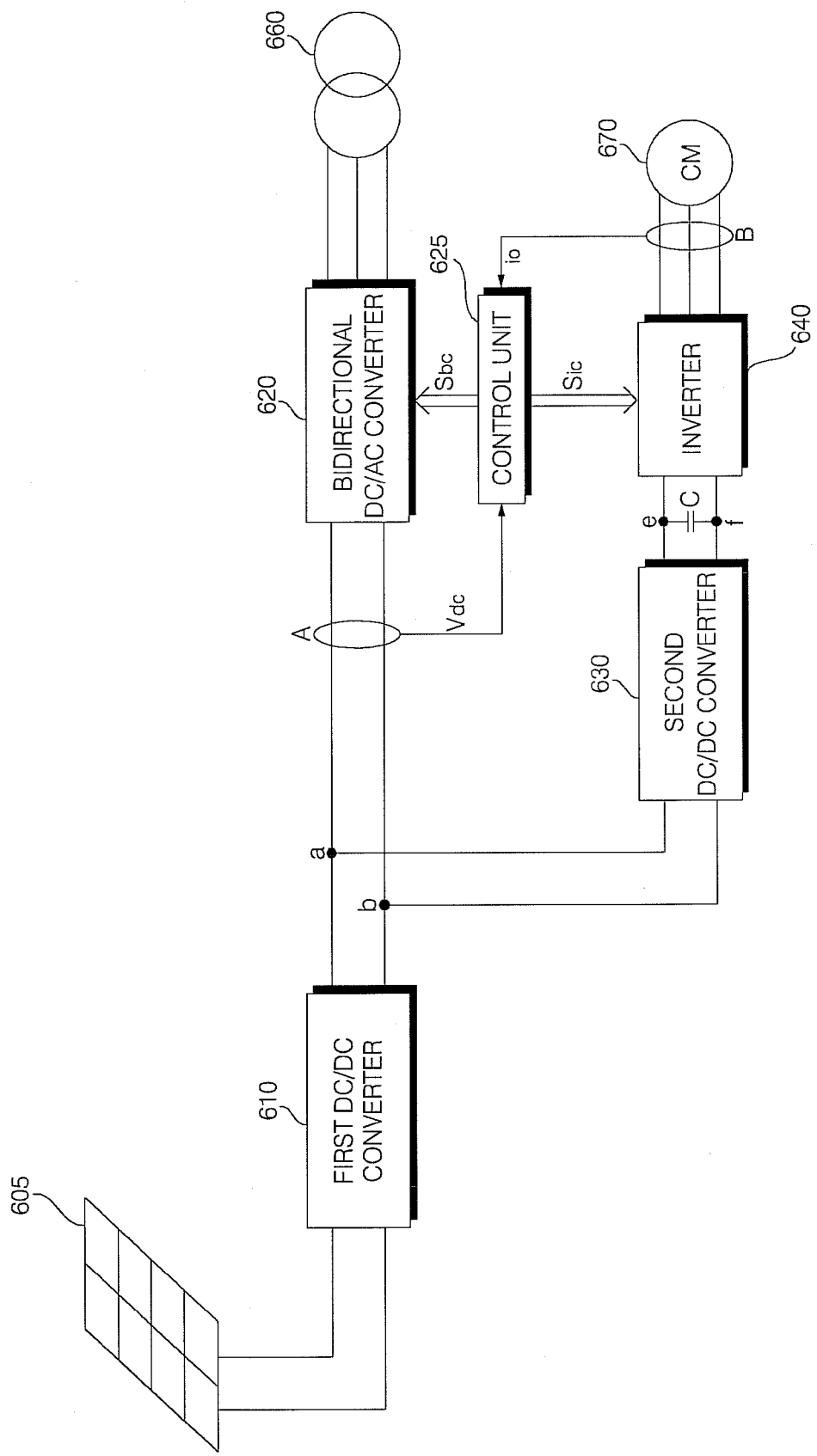
FIG. 6 is a circuit diagram illustrating a motor control device of an air conditioner using a distributed power supply according to an embodiment of the present invention.

FIG. 6 is a circuit diagram illustrating a motor control device of an air conditioner using a distributed power supply according to an embodiment of the present invention.

Referring to FIG. 6, the motor control device of an air conditioner using a distributed power supply as shown in FIG. 6 is substantially similar to the motor control device of an air conditioner using a distributed power supply as shown in FIG. 5 except that the converter control unit 525 and the inverter control unit 545 shown in FIG. 5 are implemented as a single control unit 625. That is, the dc/dc converter 610, the bidirectional dc/ac converter 620, the second dc/dc converter 630, the inverter 640, the power detecting unit A, the output current detecting unit B, and the smoothing capacitor C are the same as those described in connection with FIG. 5.

The control unit 625 controls both the bidirectional dc/ac converter 620 and the inverter 640. The control unit 625 receives DC terminal bus DC power Vdc from the power detecting unit A and outputs a bidirectional converter controls signal Sbc for control of the bidirectional dc/ac converter 620 and for control of the inverter 640, receives an output current io from the output current detecting unit B and outputs an inverter switching control signal Sic.

On the other hand, although not shown in the figures, the control unit 625 may also control the dc/dc converter 610. For example, the control unit 625 may adjust the amount of level change of the dc/dc converter 610 using the DC terminal bus DC power Vdc detected from the power detecting unit A.

Further, although not shown in the figures, the control unit 625 may also control the second dc/dc converter 630. For example, the control unit 625 may adjust the amount of level change of the second dc/dc converter 630 using the DC terminal bus DC power Vdc detected from the power detecting unit A.

Compared to FIG. 5, manufacturing costs may be saved by integrating the control unit 625 to reduce the number of components in the control unit.

Figure 7:
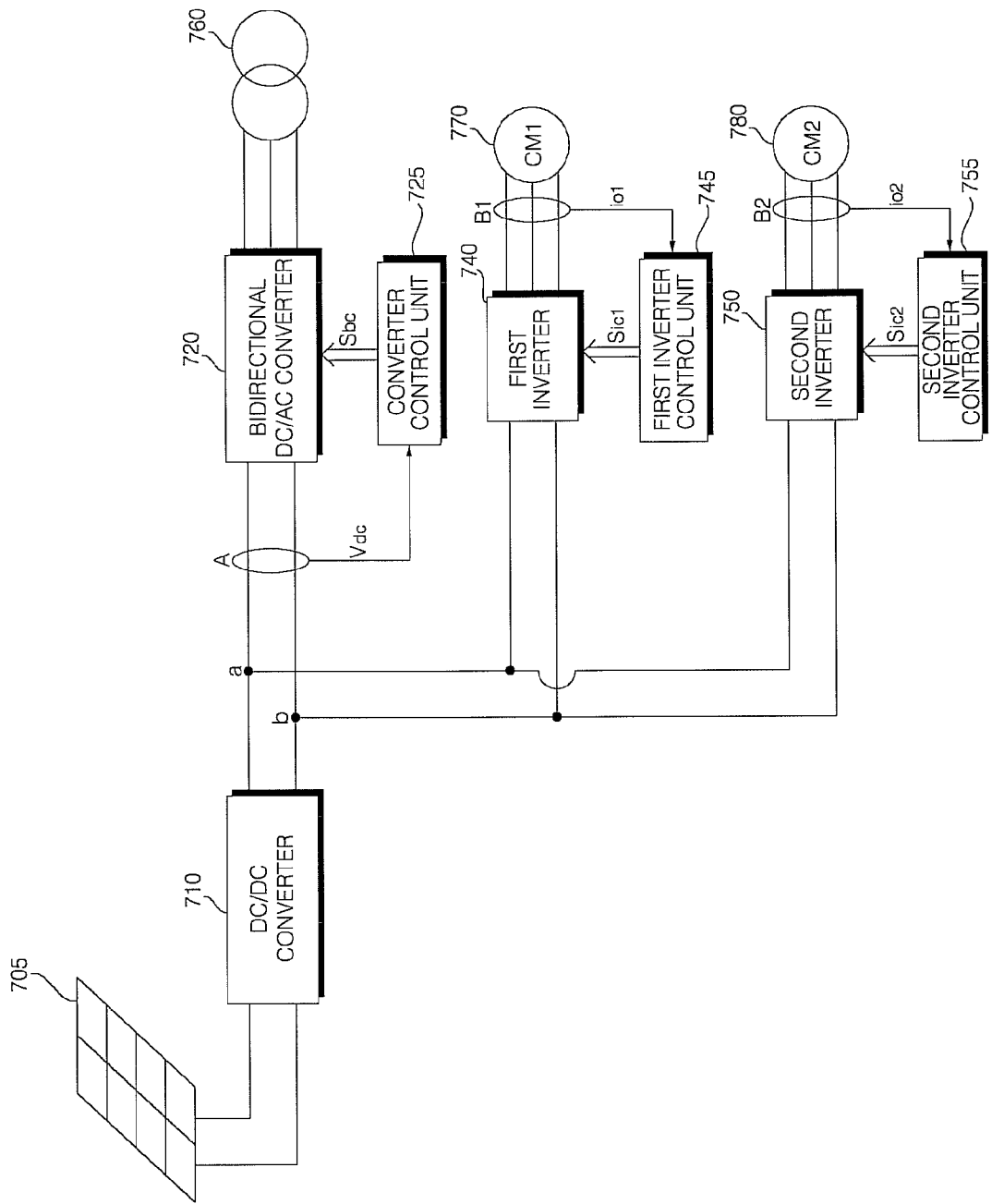
FIG. 7 is a circuit diagram illustrating a motor control device of an air conditioner using a distributed power supply according to an embodiment of the present invention.

FIG. 7 is a circuit diagram illustrating a motor control device of an air conditioner using a distributed power supply according to an embodiment of the present invention.

Referring to FIG. 7, the motor control device of an air conditioner using a distributed power supply as shown in FIG. 7 is substantially similar to the motor control device of an air conditioner using a distributed power supply as shown in FIG. 3 except for using a motor for a plurality of compressors and a controller for such a motor. In FIG. 7, a motor for two compressors is shown as an example of a motor for a plurality of compressors.

The first inverter 740 includes a plurality of switching elements and according to a switching operation converts DC terminal bus DC power Vdc into AC power of a predetermined frequency and outputs the converted power. The motor 770 for the first compressor is driven by the converted AC power.

The first inverter control unit 745 controls a switching operation of a switching element in the first inverter 740. For this purpose, the first inverter control unit 745 outputs an inverter switching control signal Sic1 to the first inverter 740. The first inverter switching control signal Sic1, which is a switching control signal for PWM, is generated based on a detected first output current io1 and output to the first inverter 740.

The first output current detecting unit B1 detects a first output current io1 flowing through the motor 770 for the first compressor. The first output current detecting unit B1 is located between the first inverter 740 and the motor 770 for the first compressor or ends thereof may be respectively connected to three lower arm switching elements of the first inverter 740.

The second inverter 750 includes a plurality of switching elements and converts DC terminal bus DC power Vdc into AC power of a predetermined frequency according to a switching operation and outputs the converted power. The motor 780 for the second compressor is driven by the converted AC power.

The second inverter control unit 755 controls a switching operation of a switching element in the second inverter 750. For this purpose, the second inverter control unit 755 outputs an inverter switching control signal Sic2 to the second inverter 750. The second inverter switching control signal Sic2, which is a switching control signal for PWM, is generated based on a detected second output current io2 and output to the second inverter 750.

The second output current detecting unit B2 detects the second output current io2 flowing through the motor 780 for the second compressor. The second output current detecting unit B2 is located between the second inverter 750 and the motor 780 for the second compressor or ends thereof may be respectively connected to three lower arm switching elements of the second inverter 750.

The dc/dc converter 710, the bidirectional dc/ac converter 720, the converter control unit 725, and the power detecting unit A are the same as those described in connection with FIG. 3.

Problems with a harmonic current may become worse in a multi-type air conditioner having a motor for a plurality of compressors. However, such problems with harmonic current do not occur by converting DC power from an outside into AC power using a dc/dc converter as shown in FIG. 7 and supplying the AC power to a system or by driving the motor for compressors. Further, there is no need for a separate EMI noise filter thus saving manufacturing costs. Further, a reactor is unnecessary for power factor correction. Further, it may be possible to supply power to a system using a bidirectional dc/ac converter or to drive a motor for a plurality of compressors using power from the system.

Figure 8:
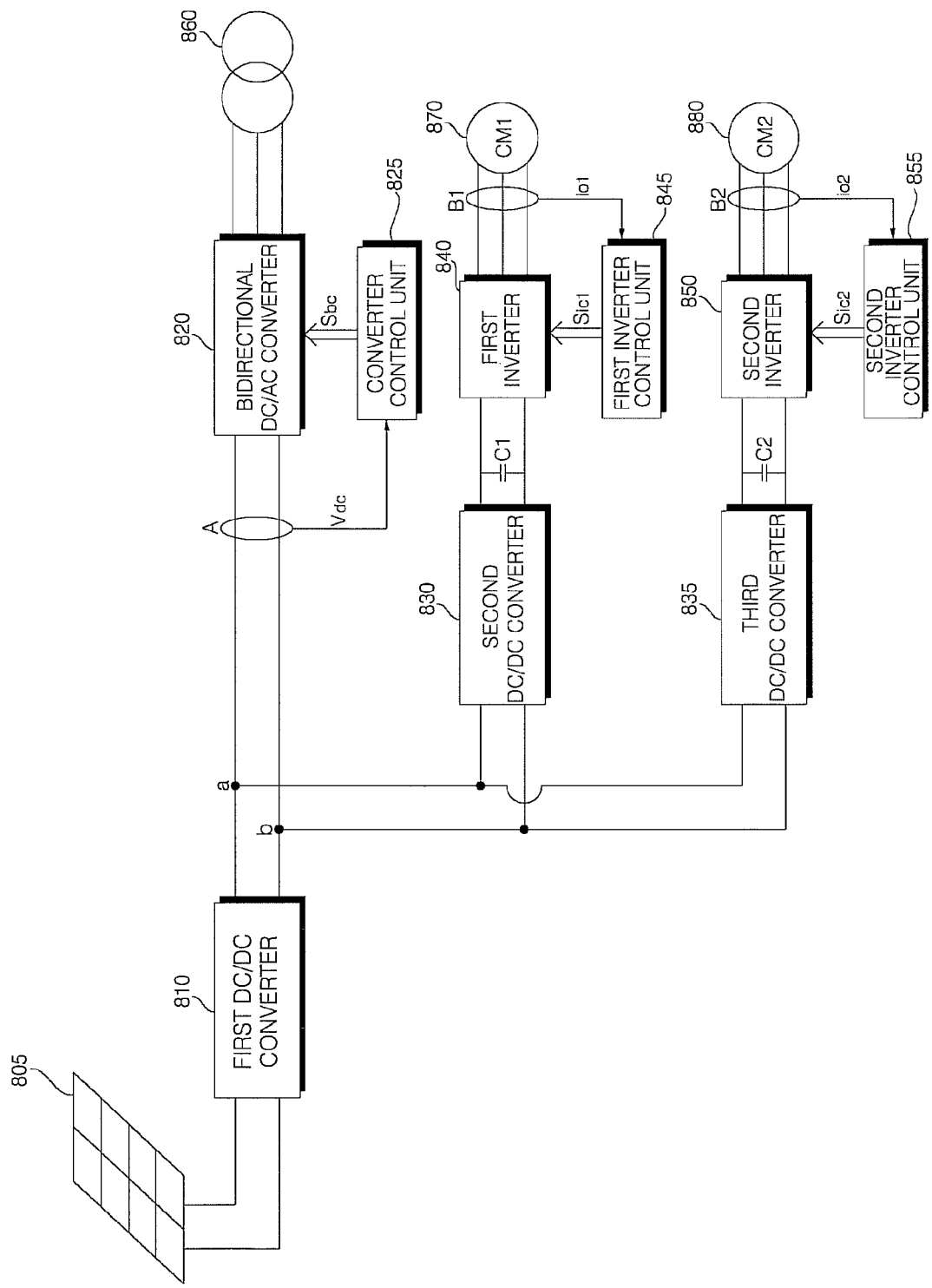
FIG. 8 is a circuit diagram illustrating a motor control device of an air conditioner using a distributed power supply according to an embodiment of the present invention.

FIG. 8 is a circuit diagram illustrating a motor control device of an air conditioner using a distributed power supply according to an embodiment of the present invention.

Referring to FIG. 8, the motor control device of an air conditioner using a distributed power supply shown in FIG. 8 is substantially similar to the motor control device of an air conditioner using a distributed power supply shown in FIG. 8 except for further including a second dc/dc converter 830 and a third dc/dc converter 835. That is, the first dc/dc converter 810, the bidirectional dc/ac converter 820, the converter control unit 825, the first inverter 840, the first inverter control unit 845, the second inverter 850, the second inverter control unit 855, the power detecting unit A, the first output current detecting unit B1, and the second output current detecting unit B2 are the same as those described in connection with FIG. 7.

The second dc/dc converter 830 and the third dc/dc converter 835 change DC terminal bus DC power Vdc and output the level changed power to the first inverter 840 and the second inverter 850, respectively.

In the case that the levels of the DC terminal bus DC power Vdc DC-converted through the bidirectional dc/ac converter 820 or level converted through the first dc/dc converter 810 may not be used, as is, in the first inverter 840, the levels may be raised or lowered by using the second dc/dc converter 830 and the third dc/dc converter 835 thus enhancing converting capability of the first inverter 840 and the second inverter 850. That is, this may be used when DC power supplied from the outside 805 or AC power supplied from a system is unstable.

On the other hand, although not shown in the figures, the converter control unit 825 may control operation of the second dc/dc converter 830 and the third dc/dc converter 835. For this purpose, the converter control unit 825 may receive detected DC terminal bus DC power Vdc and output a second converter control signal (not shown) and a third converter control signal (not shown) to the second dc/dc converter 830 and the third dc/dc converter 835, respectively, so that the second dc/dc converter 830 and the third dc/dc converter 835 respectively convert the DC power to have predetermined levels.

On the other hand, a first smoothing capacitor C1 and a second smoothing capacitor C2 are respectively located between the second dc/dc converter 830 and the first inverter 840 and between the third dc/dc converter 835 and the second inverter 850 to smooth and store DC power converted through the second dc/dc converter 830 and the third dc/dc converter 835. Accordingly, the first inverter 840 and the second inverter 850 may operate stably.

Figure 9:
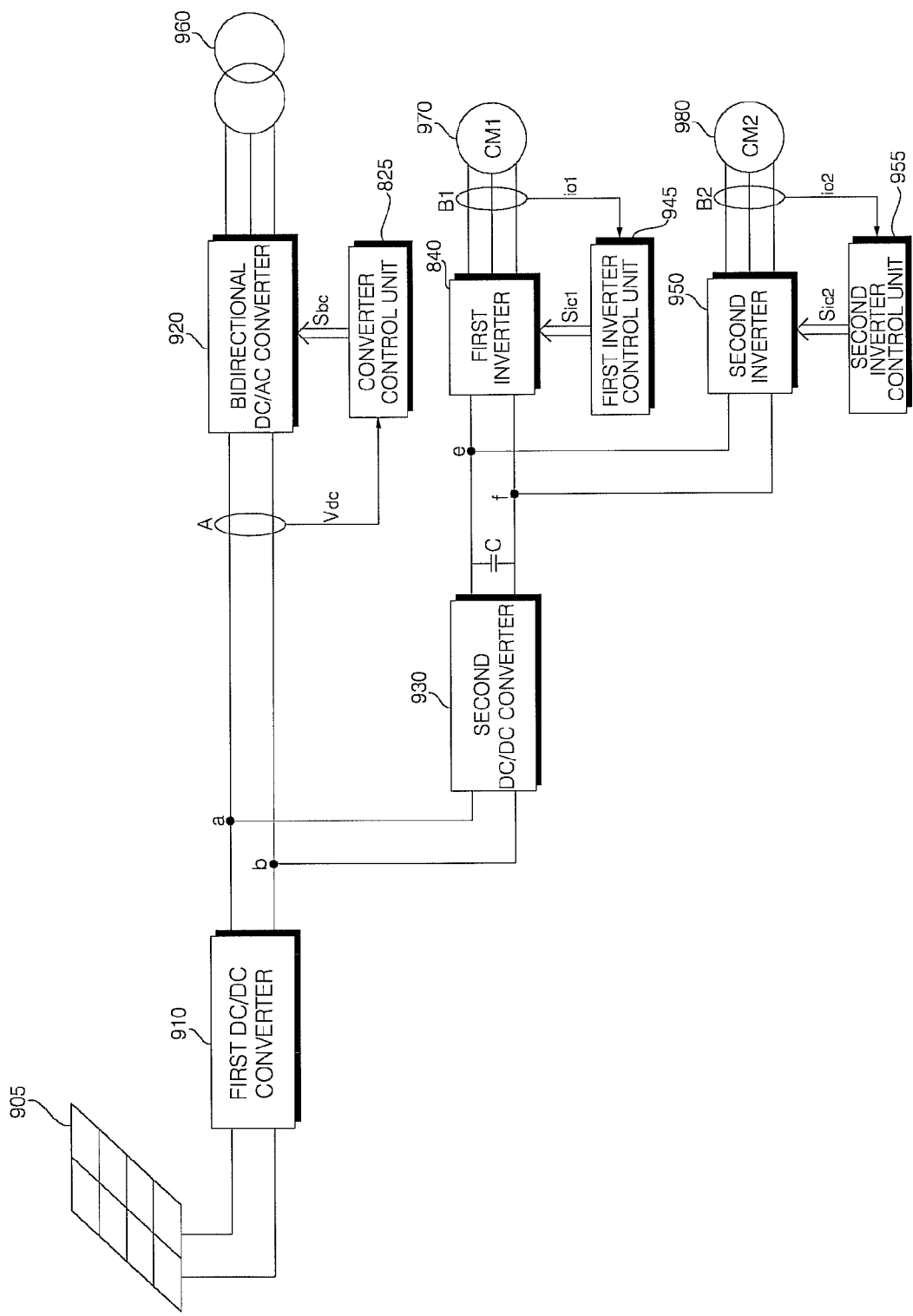
FIG. 9 is a circuit diagram illustrating a motor control device of an air conditioner using a distributed power supply according to an embodiment of the present invention.

FIG. 9 is a circuit diagram illustrating a motor control device of an air conditioner using a distributed power supply according to an embodiment of the present invention.

Referring to FIG. 9, the motor control device of an air conditioner using a distributed power supply as shown in FIG. 9 is substantially similar to the motor control device of an air conditioner using a distributed power supply as shown in FIG. 8 except that a single second dc/dc converter 930 is used instead of the second dc/dc converter 830 and the third dc/dc converter 835 as shown in FIG. 8. That is, the first dc/dc converter 910, the bidirectional dc/ac converter 920, the converter control unit 925, the first inverter 940, the first inverter control unit 945, the second inverter 950, the second inverter control unit 955, the power detecting unit A, the first output current detecting unit B1, and the second output current detecting unit B2 are the same as those described in connection with FIG. 8.

By supplying common level-changed DC power to the first inverter 940 and the second inverter 950 using a single second dc/dc converter 930 and a smoothing capacitor C, the first inverter 940 and the second inverter 950 may operate stably and manufacturing costs may be saved.

Figure 10:
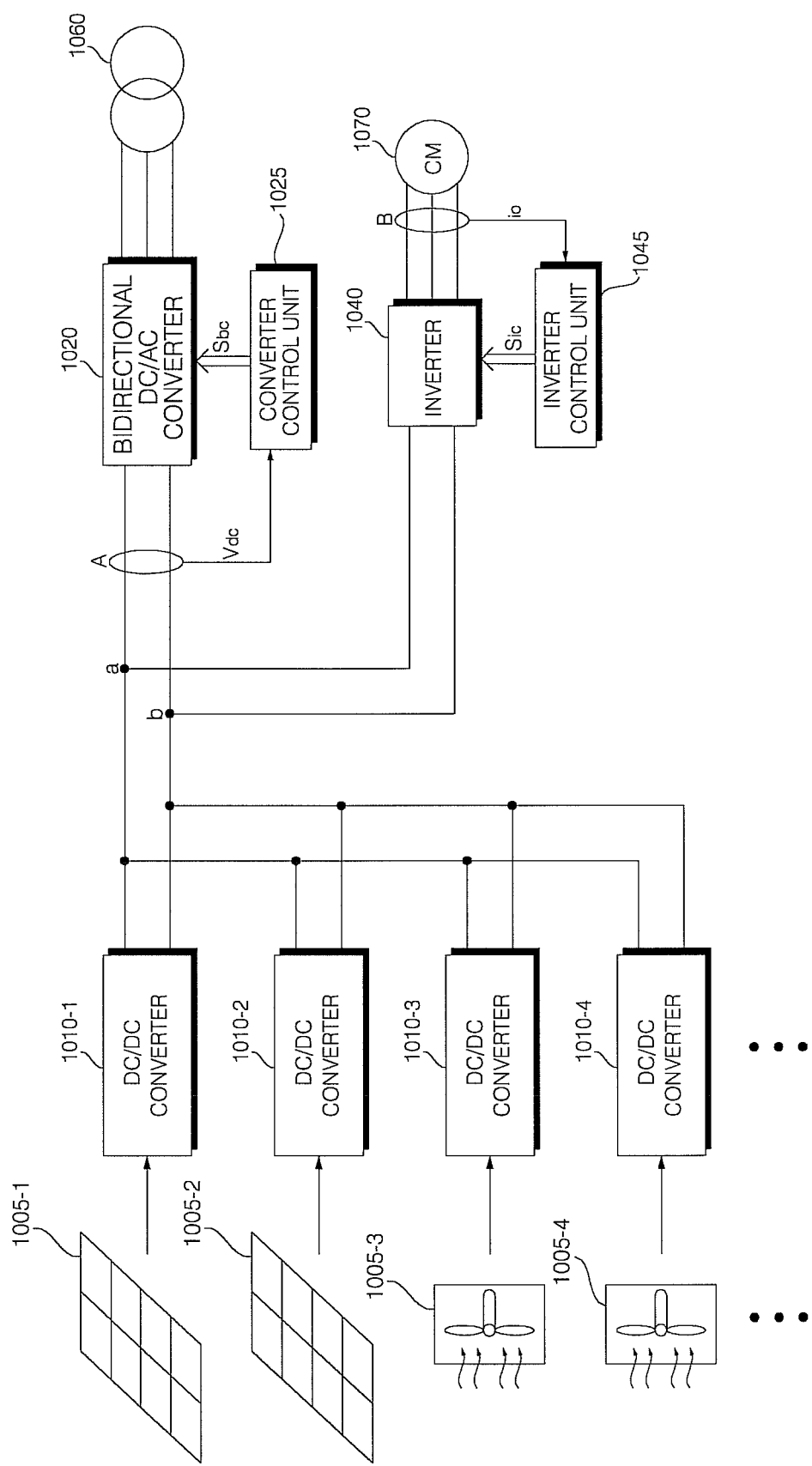
FIG. 10 is a circuit diagram illustrating a motor control device of an air conditioner using a distributed power supply according to an embodiment of the present invention.

FIG. 10 is a circuit diagram illustrating a motor control device of an air conditioner using a distributed power supply according to an embodiment of the present invention.

Referring to FIG. 10, the motor control device of an air conditioner as shown in FIG. 10 is substantially similar to the motor control device of an air conditioner as shown in FIG. 3 except for using a plurality of dc/dc converters 1010-1, 1010-2, 1010-3, 1010-4 .... That is, the converter 1020, the converter control unit 1025, the inverter 1040, the inverter control unit 1045, the power detecting unit A, and the output current detecting unit B are the same as those described in connection with FIG. 3.

The plurality of dc/dc converts 1010-1, 1010-2, 1010-3, 1010-4 . . . change levels of DC power supplied from a plurality of power supplying sources 1005-1, 1005-2, 1005-3, 1005-4 . . . and output the changed power to the DC terminal bus.

At this time, the plurality of power supplying sources 1005-1, 1005-2, 1005-3, 1005-4 . . . are power supplying sources that convert at least one of solar power, wind power, tidal power, and geothermal power, as energy sources, into DC power. Although in the figure power supplying sources 1005-1 and 1005-2 using solar power, a power supplying source 1005-3 using wind power, and a power supplying source 1005-4 using tidal power are shown, the present invention is not limited thereto and a plurality of single energy supplying sources may be used.

Although in the figure the plurality of dc/dc converts 1010-1, 1010-2, 1010-3, 1010-4 . . . correspond to the plurality of power supplying sources 1005-1, 1005-2, 1005-3, 1005-4 . . . , the present invention is not limited thereto and a single dc/dc converter may receive, in parallel, DC power from a plurality of power supplying sources.

By using such plurality of dc/dc converters 1010-1, 1010-2, 1010-3, 1010-4 . . . , it may be possible to stably supply DC power level to the DC terminal bus. For example, DC power from the power supplying sources 1005-1 and 1005-2 using solar power during a day time and DC power from the power supplying source 1005-4 using tidal power or the power supplying source 1005-3 using wind power during a night time may be subjected to level change through the dc/dc converter so that power may be stably output to the DC terminal bus.

As described above, the plurality of dc/dc converters 1010-1, 1010-2, 1010-3, 1010-4 . . . may be configured as either a step-up type increasing level or a step-down type decreasing level, and for this purpose, each of the dc/dc converters 1010-1, 1010-2, 1010-3, 1010-4 . . . may include a switching element (not shown) and a transformer (not shown).

On the other hand, although in the figure the converter control unit 1025 and the inverter control unit 1045 are separate components, the present invention is not limited thereto and as shown in FIG. 4, the bidirectional dc/ac converter 1020 and the inverter 1040 may be also controlled by a single control unit.

As described above, there does not occur a problem with a harmonic current by converting DC power from an outside into AC power using the dc/dc converter and supplying the converted AC power to the system or driving the motor for a compressor. Further, there is no need for a separate noise filter thus saving manufacturing costs. Further, a reactor for power factor correction is unnecessary. Further, it may be possible to supply power to a system using a bidirectional dc/ac converter or to drive a motor for a compressor using power from the system.

Figure 11:
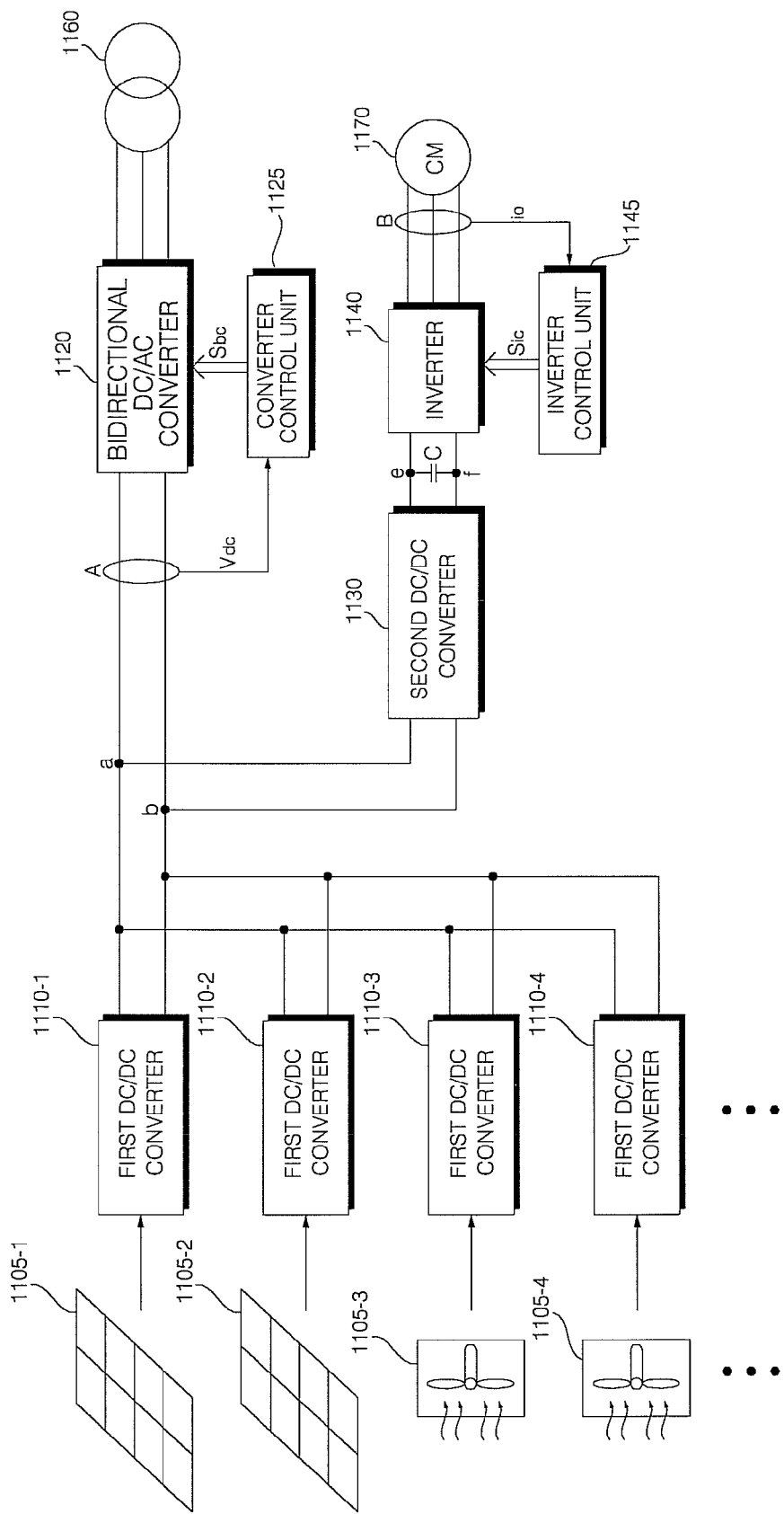
FIG. 11 is a circuit diagram illustrating a motor control device of an air conditioner using a distributed power supply according to an embodiment of the present invention.

FIG. 11 is a circuit diagram illustrating a motor control device of an air conditioner using a distributed power supply according to an embodiment of the present invention.

Referring to FIG. 11, the motor control device of an air conditioner using a distributed power supply as shown in FIG. 11 is substantially similar to the motor control device of an air conditioner using a distributed power supply as shown in FIG. 10 except for further including a second dc/dc converter 1130 between the DC terminal bus (a-b terminals) and the inverter 1140. Accordingly, the plurality of power supplying sources 1105-1, 1105-2, 1105-3, 1105-4 . . . , the plurality of dc/dc converters 1110-1, 1110-2, 1110-3, 1110-4 . . . , the bidirectional dc/ac converter 1120, the converter control unit 1125, the inverter 1140, the inverter control unit 1145, the power detecting unit A, and the output current detecting unit B as shown in FIG. 11 are the same as those described in connection with FIG. 10.

As shown in FIG. 5, the second dc/dc converter 1130 changes a level of the DC terminal bus DC power Vdc and outputs the level changed power to the inverter 1140. In the case that the levels of the DC terminal bus DC power Vdc DC converted through the bidirectional dc/ac converter 1120 or level changed through the plurality of first dc/dc converters 1110-1, 1110-2, 1110-3, 1110-4 . . . may not be used, as is, in the inverter 1140, the levels are raised or lowered by the second dc/dc converter 1130 thus enhancing converting capability of the inverter 1140. That is, this may be used when DC power supplied from the power supplying sources 1105-1, 1105-2, 1105-3, 1105-4 . . . or AC power supplied from a system is unstable.

Further, control power may be supplied from the second dc/dc converter 1130 for operating the converter control unit 1125 and the inverter control unit 1145. That is, the second dc/dc converter 1130 may output various levels of DC power.

On the other hand, although not shown in the figure, the converter control unit 1125 may also control operation of the second dc/dc converter 1130. For this purpose, the converter control unit 1125 may receive detected DC terminal bus DC power Vdc and output a second converter control signal (not shown) to the second dc/dc converter 1130 so that the second dc/dc converter 1130 converts and outputs DC power to have a predetermined level.

On the other hand, a smoothing capacitor C is arranged between terminals e and f which is between the second dc/dc converter 1130 and the inverter and smoothes and stores DC power converted through the second dc/dc converter 1130. Accordingly, the stored DC power may be stably supplied to the inverter 1140.

On the other hand, although in the figure the converter control unit 1125 and the inverter control unit 1145 are configured as separate components, the present invention is not limited thereto and as shown in FIG. 6, the bidirectional dc/ac converter 1120 and the inverter 1140 may be controlled through a single control unit.

Figure 12:
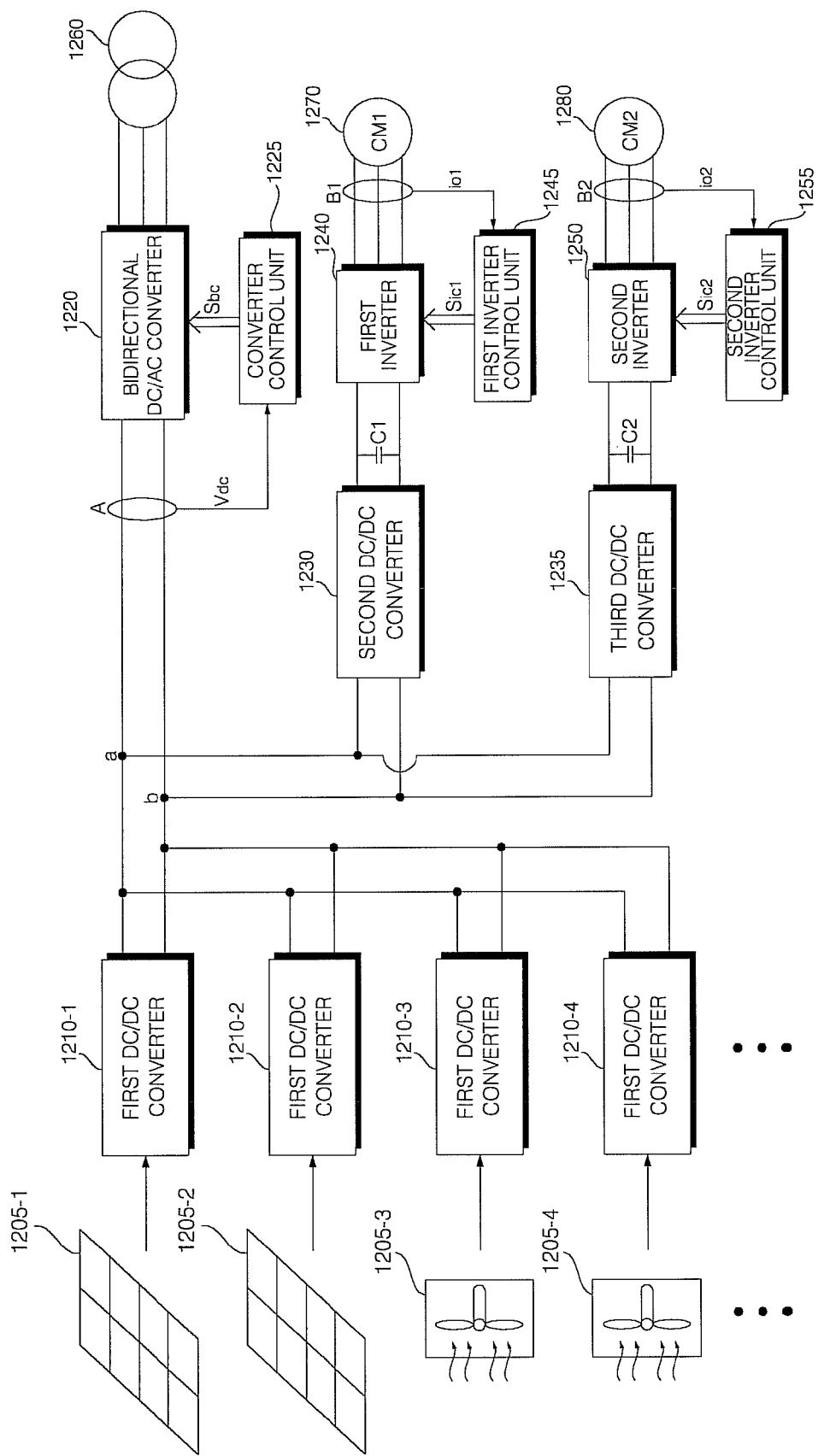
FIG. 12 is a circuit diagram illustrating a motor control device of an air conditioner using a distributed power supply according to an embodiment of the present invention.

FIG. 12 is a circuit diagram illustrating a motor control device of an air conditioner using a distributed power supply according to an embodiment of the present invention.

Referring to FIG. 12, the motor control device of an air conditioner using a distributed power supply as shown in FIG. 12 is substantially similar to the motor control device of an air conditioner using a distributed power supply as shown in FIG. 8 except for using a plurality of first dc/dc converters 1210-1, 1210-2, 1210-3, 1210-4 .... That is, the dc/ac converter 1220, the converter control unit 1225, the second dc/dc converter 1230, the first inverter 1240, the first inverter control unit 1245, the third dc/dc converter 1235, the second inverter 1250, the second inverter control unit 1255, the power detecting unit A, the first output current detecting unit B1, the second output current detecting unit B2, the first smoothing capacitor C1, and the second smoothing capacitor C2 are the same as those described in connection with FIG. 8.

The plurality of first dc/dc converters 1210-1, 1210-2, 1210-3, 1210-4 . . . change levels of DC power supplied from a plurality of power supplying sources 1205-1, 1205-2, 1205-3, 1205-4 . . . and output the level changed power to the DC terminal bus.

Here, description on the plurality of first dc/dc converters 1210-1, 1210-2, 1210-3, 1210-4 . . . and the plurality of power supplying sources 1205-1, 1205-2, 1205-3, 1205-4 . . . refers to the description in connection with FIG. 10.

By using such plurality of dc/dc converters 1210-1, 1210-2, 1210-3, 1210-4 . . . , it may be possible to stably supply DC power level to the DC terminal bus. For example, DC power from the power supplying sources 1210-1 and 1210-2 using solar power during a day time and DC power from the power supplying source 1210-4 using tidal power or the power supplying source 1210-3 using wind power during a night time may be subjected to level change through the dc/dc converter so that power may be stably output to the DC terminal bus.

On the other hand, the second dc/dc converter 1230 and the third dc/dc converter 1235 may be omitted as shown in FIG. 7 and only the second dc/dc converter 1230 may be used as shown in FIG. 9.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

INDUSTRIAL APPLICABILITY

The motor control device of an air conditioner using a distributed power supply according to the present invention may be used to convert DC power from an outside into AC power and supply the AC power to a system or to drive a motor for a compressor.

The invention claimed is:

1. A motor control device of an air conditioner using a distributed power supply comprising:
a first dc/dc converter which is supplied an outside DC power and converts the outside DC power to a first level DC power which is output to a DC terminal bus;
a power detecting unit to detect a DC terminal bus DC power;
a bidirectional dc/ac converter to convert the DC terminal bus DC power into a first AC power and to transfer the first AC power to a system, or to convert a second AC power from the system into a second level DC power and to supply the second level DC power to the DC terminal bus;
an inverter to convert the DC terminal bus DC power into a third AC power by a switching operation and to drive a motor for a compressor using the third AC power;
an output current detecting unit to detect an output current flowing through the motor for the compressor;
a second dc/dc converter to convert the DC terminal bus DC power to a third level DC power and to output the third level DC power to the inverter;
a control unit to control switching elements in the inverter, to control the bidirectional dc/ac converter, and to control the second dc/dc converter,
wherein the control unit receives DC terminal bus DC power from the power detecting unit and outputs a bidirectional converter controls signal for control of the bidirectional dc/ac converter, and
the control unit receives the output current from the output current detecting unit and outputs an inverter switching control signal for control of the inverter,
wherein the control unit controls the first dc/dc converter to adjust the first level DC power output from the first dc/dc converter using the DC terminal bus DC power detected from the power detecting unit,
wherein the control unit controls the second dc/dc converter to adjust the third level DC power output from the second dc/dc converter using the DC terminal bus DC power detected from the power detecting unit,
wherein the control unit controls the bidirectional dc/ac converter to convert the DC terminal bus DC power into the first AC power and transfer the first AC power to the system when the DC terminal bus DC power is greater than or equal to a predetermined value, and to convert the second AC power from the system to the second level DC power and transfer the second level DC power to the DC terminal bus when the DC terminal bus DC power is less than the predetermined value,
wherein when the second level DC power output from the bidirectional dc/ac converter or the first level DC power output from the first dc/dc converter is outside allowable range for operation of the inverter, the second dc/dc converter converts the DC terminal bus DC power to the third level DC power and outputs to the third level DC power to the inverter.

2. The motor control device of claim 1, further comprising:
a storage capacitor to store the DC terminal bus DC power.

3. The motor control device of claim 1, wherein the outside DC power is electrically converted from at least one of solar power, wind power, tidal power, or geothermal power.

4. The motor control device of claim 1, wherein the control unit includes:
an estimating unit to estimate a speed of a rotor of the motor based on output current flowing through the motor;
a current command generating unit to generate a current command value based on the estimated speed and a speed command value;
a voltage command generating unit to generate a voltage command value based on the current command value and the output current; and
a switching control signal output unit to output the inverter switching control signal based on a voltage command value,
wherein the inverter switching control signal is applied to a gate terminal of the switching elements in the inverter to control on or off of the switching elements in the inverter.

5. A motor control device of an air conditioner comprising:
a first dc/dc converter which is supplied an outside DC power and converts the outside DC power to a first level DC power which is output;

a power detecting unit to detect a DC terminal bus DC power;
a bidirectional dc/ac converter to convert the DC terminal bus DC power into a first AC power and to transfer the first AC power to a system, or to convert a second AC power from the system into a second level DC power and to supply the second level DC power to the DC terminal bus;
a plurality of inverters to respectively convert the DC terminal bus DC power into a plurality of AC power by a switching operation and to drive a plurality of motors for a compressor using the plurality of AC power;
an output current detecting unit to detect an output current flowing through a first motor from among the plurality of motors;
a second dc/dc converter to convert the DC terminal bus DC power into a third level DC power and to output the third level DC power to a first inverter of the plurality of inverters;
a third dc/dc converter to convert the DC terminal bus DC power into a fourth level DC power and to output the fourth level DC power to a second inverter of the plurality of inverters;
a control unit to control switching elements in the plurality of inverters, to control the bidirectional dc/ac converter, and to control the first, second and third dc/dc converter,
wherein the control unit receives DC terminal bus DC power from the power detecting unit and outputs a bidirectional converter controls signal for control of the bidirectional dc/ac converter, and
the control unit receives the output current from the output current detecting unit and outputs an inverter switching control signal for control of the first inverter,
wherein the control unit controls the first dc/dc converter to adjust the first level DC power output from the first dc/dc converter using the DC terminal bus DC power detected from the power detecting unit,
wherein the control unit controls the second dc/dc converter to adjust the third level DC power output from the second dc/dc converter using the DC terminal bus DC power detected from the power detecting unit, wherein the control unit controls the bidirectional dc/ac converter to convert the DC terminal bus DC power into the first AC power and transfer the first AC power to the system when the DC terminal bus DC power is greater than or equal to a predetermined value, and to convert the second AC power from the system to the second level DC power and transfer the second level DC power to the DC terminal bus when the DC terminal bus DC power is less than the predetermined value,
wherein when the second level DC power output from the bidirectional dc/ac converter or the first level DC power output from the first dc/dc converter is outside allowable range for operation of one of the first inverter, the second dc/dc converter converts the DC terminal bus DC power to the third level DC power and outputs to the third level DC power to the first inverter.

6. The motor control device of claim 5, wherein the outside DC power is electrically converted from at least one of solar power, wind power, tidal power, or geothermal power.

7. The motor control device of claim 5, wherein the control unit includes:
an estimating unit to estimate a speed of a rotor of the first motor based on output current flowing through the first motor;
a current command generating unit to generate a current command value based on the estimated speed and a speed command value;
a voltage command generating unit to generate a voltage command value based on the current command value and the output current; and
a switching control signal output unit to output the inverter switching control signal based on a voltage command value,
wherein the inverter switching control signal is applied to a gate terminal of the switching elements in the first inverter to control on or off of the switching elements in the first inverter.

* * * * *